United States Patent [19]
Ogle

[11] Patent Number: 5,253,446
[45] Date of Patent: Oct. 19, 1993

[54] FLOW-THROUGH FISHING LURE

[76] Inventor: Donald E. Ogle, 906 N. Webster, Kokomo, Ind. 46901

[21] Appl. No.: 848,104

[22] Filed: Mar. 9, 1992

[51] Int. Cl.$^5$ .............................................. A01K 85/00
[52] U.S. Cl. .................. 43/42.13; 43/42.06; 43/42.11; 43/42.12; 43/42
[58] Field of Search ............ 43/42, 42.05, 42.06, 43/42.13, 42.11, 42.12

[56] References Cited

U.S. PATENT DOCUMENTS

| | | |
|---|---|---|
| 576,680 | 2/1897 | Kittle . |
| 1,036,380 | 8/1912 | Tileston . |
| 1,522,019 | 1/1925 | Mantz .................... 43/42.11 |
| 2,213,701 | 8/1938 | Haselwood . |
| 2,667,008 | 1/1954 | Baum . |
| 3,141,255 | 7/1964 | Randall .................. 43/42.11 |
| 3,293,791 | 12/1966 | Hinkson . |
| 3,405,475 | 10/1968 | Ross . |
| 3,650,062 | 3/1972 | Troyer .................... 43/42.06 |
| 3,708,903 | 1/1973 | Bercz et al. . |
| 3,762,092 | 10/1973 | Bercz et al. . |
| 4,012,862 | 3/1977 | Dubois .................... 43/42.06 |
| 4,201,007 | 5/1980 | Backstrom ............... 43/42.12 |
| 4,208,822 | 6/1980 | Bryant . |
| 4,640,040 | 2/1987 | Smith ......................... 43/42 |
| 4,742,639 | 5/1988 | Gunn ....................... 43/42.13 |
| 4,793,090 | 12/1988 | Cooper . |
| 4,881,341 | 11/1989 | Dickey .................... 43/42.12 |
| 5,058,309 | 10/1991 | Firmin ..................... 43/42.13 |

FOREIGN PATENT DOCUMENTS 500399  2/1939  United Kingdom .............. 43/42.12

OTHER PUBLICATIONS

Cabela's 1991 Spring Annual Catalog, pp. 38-80.

*Primary Examiner*—Kurt C. Rowan
*Attorney, Agent, or Firm*—Woodard, Emhardt, Naughton, Moriarty & McNett

[57] ABSTRACT

A fishing lure apparatus is disclosed which includes a substantially elliptical or tear-drop shaped ring or rings defining a central opening, the ring corresponding generally in profile and size to a fishing bait. The ring allows fluid to flow transversely through the center opening as the ring is drawn through a body of water in a direction perpendicular to fluid flow in the body of water. The lure also includes a fishing hook mounted to a projection extending out from the ring. Attached to another projection are means for attracting fish, which may include spinners and the like. The rings are made from metal wire, or from solid or hollow polymeric material. Skirts, spoons and other optical attracting devices are contemplated as fish attracting elements of the invention.

18 Claims, 4 Drawing Sheets

FLOW-THROUGH FISHING LURE

FIELD OF THE INVENTION

This invention relates generally to fishing tackle or equipment and more specifically to fishing lures including functional attributes which render the lure more effective in moving bodies of water such as streams and rivers.

BACKGROUND OF THE INVENTION

An improved fishing lure is the quest of many fishermen and has been the subject of many patents. It is generally known by fishermen and verified through scientific experiments that fish are attracted by light. Thus, an effective fishing lure must attract fish to strike, and one approach is to include some optical attracting device. As a second requirement, a lure must be capable of retaining the fish after the fish has struck the lure and is "hooked". Finally, it is desired that a fishing lure be adaptable to the environment in which it shall be used.

It is well known that a typical fishing lure may be weighted or include planar or curvilinear surfaces designed to deflect fluid flow upward and thereby urge the lure into deeper water. If a lure is to be used in weedy areas, a weedless hook device may be employed to help reduce or prevent snagging of the hook on the weeds. In flowing bodies of water, a lure which is less affected by the moving water provides a significant advantage in placement or movement of the lure through the water.

U.S. Pat. No. 3,405,475 to Ross discloses a fishing lure formed substantially of channel shape and adapted for disposition transverse to the direction of movement in water. The channel includes a lower or bottom portion, an upturned front well or portion provided with a forwardly extending inclined continuation or offset, and a rear upturned wall or portion disposed substantially parallel to the front wall.

U.S. Pat. No. 4,208,822 to Bryant discloses a fishing lure having a flexible resilient intermediate body portion which upon imparting a sudden jerk to the line will cause the intermediate portion to collapse in a manner which simulates the movement of a squid through the water. The collapsing intermediate portion of the lure also generates an audible sound which is much like the sound made by a squid.

U.S. Pat. No. 2,667,008 to Baum discloses a two part shock absorbing triggered release rigging design that releases a trolling line when a fish strikes. The Baum device uses a wire harness and a separate lure is typically attached to the harness by a leader. The trolling release rigging in FIG. 1 illustrates a leader 12 which connects to a lure.

U.S. Pat. No. 3,293,791 to Hinkson discloses a fishing gear for use with small bait fish which is inserted into the mouth end of a bait fish to stiffen and shape it. The objective of the Hinkson device is to hook up to a herring in such a manner that attachment is secure and the bait fish retains an appearance effective to attract predatory fish such as salmon. The Hinkson apparatus is formed of wire and inserted into the mouth of live bait.

U.S. Pat. No. 1,036,380 to Tileston discloses a device wherein cuts are made in a blank and wings are formed by bending the cut-out portion away from the blank. The wings impart a moment force to the lure causing the lure to spin as it is drawn through the water.

U.S. Pat. No. 576,680 to Kittle includes a feature similar to the Tileston device in that wings projecting out from a central portion of the lure induce a moment force to the lure as it is drawn through the water. The lure responds to the moment force by rotating as it is drawn through the water.

None of the above references discloses a fishing lure which is stable in attitude and resistant to lateral movement when disposed in cross-flowing water thereby enabling an angler to more precisely position the fishing lure. Such a fishing lure is needed for use in fast flowing brooks and streams.

SUMMARY OF THE INVENTION

A fishing lure according to one aspect of the present invention includes a substantially elliptical ring having a center opening, the ring corresponding generally in profile and size to a fishing bait, and wherein the ring allows fluid to flow transversely through the center opening as the ring is drawn through a body of water in a direction perpendicular to fluid flow in the body of water, a fishing hook mounted to the ring, means for attracting fish attached to the ring, and wherein the attitude of the lure is substantially stable as it is drawn through water.

A fishing lure according to another aspect of the present invention includes a first tear-drop shaped ring having a rounded portion and a tapered tip portion, a second tear-drop shaped ring having a rounded portion and a tapered tip portion, the first and second rings having substantially similar shapes, and wherein the first ring is disposed within and joined to the second ring at a location on the rounded portion and at the tip portion, a fishing hook mounted to the tapered tip portion of the first and second rings, a first projection extending from the tapered portion of the first and second rings, means for attracting fish attached to the first projection, and wherein the attitude of the lure is substantially stable as it is drawn through water.

One object of the present invention is to provide an improved fishing lure for use in moving waterways.

Another object of the present invention is to provide a fishing lure that is less affected by counter and cross-currents which are present in a moving body of water.

A further object of the present invention is to provide a fishing lure having a reduced profile surface area yet still has a bait-like silhouette.

Yet another object of the present invention is to provide a rugged noncorroding fishing lure.

Still another desired object of the present invention is to provide a fishing lure having a resilient collapsible frame which yields under stress to aid an angler in securing the release of the lure from a submerged log or tire.

Another desired result is a fishing lure which is relatively inexpensive to manufacture since the common loss of lures in certain fishing environments can amount to significant economic loss to the angler of modest means.

Other related objects and advantages of the present invention will become more apparent from the following description of the preferred embodiment.

DESCRIPTION OF THE PREFERRED EMBODIMENT

Figure 1:
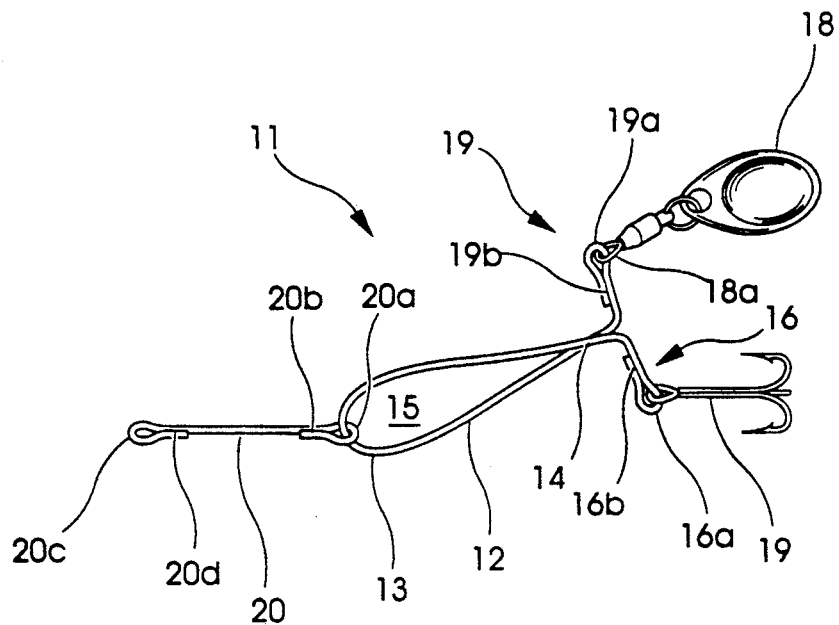
FIG. 1 is an isometric view of a fishing lure according to one aspect of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, an isometric view of a flow-through fishing lure 11 according to the present invention is shown. Fishing lure 11 includes a relatively rigid substantially elliptical loop or ring 12 formed from a single piece of wire and bent into shape to form the ring or loop 12 and the extension arms or projections 16 and 19. Ring 12 may also be said to have a tear-drop profile. The wire may be galvanized steel, copper, or stainless steel from 10–24 gauge in diameter. Wire with highly polished surfaces provides light reflections well known to attract the attention of fish and encourage the fish to strike. Larger and smaller wire diameters are contemplated but may find only limited application for use in constructing a fishing lure according to the present invention. Ring 12 corresponds generally in profile and size to a fishing bait or tear-drop and forms a center opening or aperture 15. The ring 12 includes a round portion 13 and a tapered tip portion 14. A treble hook is attached to arm 16 by forming a loop or eyelet 16a in arm 16 and guiding the eyelet of a typical treble hook 17 over the free end of the wire prior to bending the wire over and attaching it to itself via solder or other adhesive at location 16b. A similar construction step is executed to form arm 19 by bending the wire 12 to form a loop or eyelet 19a to receive a ring portion 18a of a spinner attachment 18. The loop 19a is secured via solder at 19b. Spinner 18 is a means for attracting fish and is attached to extension arm 19. Solder or other adhesive is applied at tapered tip 14 to secure the ring 12 to itself. Link 20 moves freely along ring 12 and is made of a piece of metal wire bent around ring 12 to form a loop 20a and is attached to itself with solder or other suitable adhesive at 20b, and similarly the loop or eyelet 20c is formed and soldered at 20d. A fishing line (not shown) or leader is attached to loop 20c. It is also contemplated that the fishing line may be attached or tied directly to the tear-drop or elliptically shaped ring 12 thus eliminating the need for link 20.

It is contemplated that the solder may be eliminated by forming the wire loops (19a and 16a) and wrapping or twisting the wire about itself to construct a lure according to the present invention. Twisting of the wire at 14 would substitute for the solder applied at 14. Alternatively, a smaller piece of fine wire is suitable to wrap around and attach the wire loop 12 to itself. Similarly, the solder used to construct link 20 is not required if link 20 is constructed using wire bending and securing techniques. In this manner, the manufacturing costs of the lure 11 may be reduced. However, the weight of the solder applied directly affects the total weight of the lure 11 and accordingly the sink rate of the lure when the lure is placed in the water. Lead solder and weights attached to the underside of the lure are contemplated to supply additional weight to change buoyancy or sink rate of the lure.

Ring 12 serves to attract fish because of its bait size and profile. Such bait shapes may include minnows, frogs, water insects or other bait profiles and shapes known to those skilled in the art. In this embodiment of the flow-through lure 11, the ring 12 has a minnow bait shape or profile. Metal wire (preferably non-rusting maleable metal such as copper, galvanized steel, plated steel or stainless steel) is preferred for the wire used to construct the lure 11.

Alternate embodiments may include an elliptical ring made from polymeric materials. The ring 12 can be molded from plastic to form a solid or hollow ring. Plastic can be molded over a metal reinforcing form in another embodiment to provide additional rigidity to a plastic form of the lure. Plastics come in a variety of colors and thus may provide an attractive target for a fish to strike. The attitude of the lure when placed in water can be maintained upright by constructing the lure so that the top portion of the lure is lighter than the bottom portion. Extra weight in the form of lead shot or sinkers can be added to a lower location of the lure to ensure a particular attitude of the lure in the water. Noncorroding metals and plastics are particularly preferred materials for constructing the lure.

An important aspect of the present invention is the opening 15 of the elliptical ring which enables fluid flow therethrough. Opening 15 enables superior performance in flowing waterways since a cross-current exerts less cross-force on the lure 11 due to the reduced surface area contacted by the moving water. It is also contemplated that the fishing lure 11 include various means for attracting fish such as means for reflecting light attached to the fishing lure, bright colors applied to the fishing lure, and means for imparting fish wiggling motion to the lure when the lure is drawn through a body of water. Means for reflecting light may include reflective spinners well known in the art, reflective spoons that may impart an additional attractive motion to the lure, faceted reflective surfaces and the application of iridescent coatings to the fishing lure. Means for imparting additional motion to the lure may include spinners, spoons, rotors and spinning propellers as well as other means known to those in the art for providing motion to fishing lures. It is also contemplated in alternative embodiments that other means for attracting fish are mounted to the fishing lure apparatus such as skirts or additional bait shaped portions. Alternative embodiments of the flow-through lure also include weedless attachments to reduce snagging in weedy areas. While a treble hook 17 is shown mounted to the distal end, other hook sizes, shapes and mounting locations are also contemplated.

Figure 2:
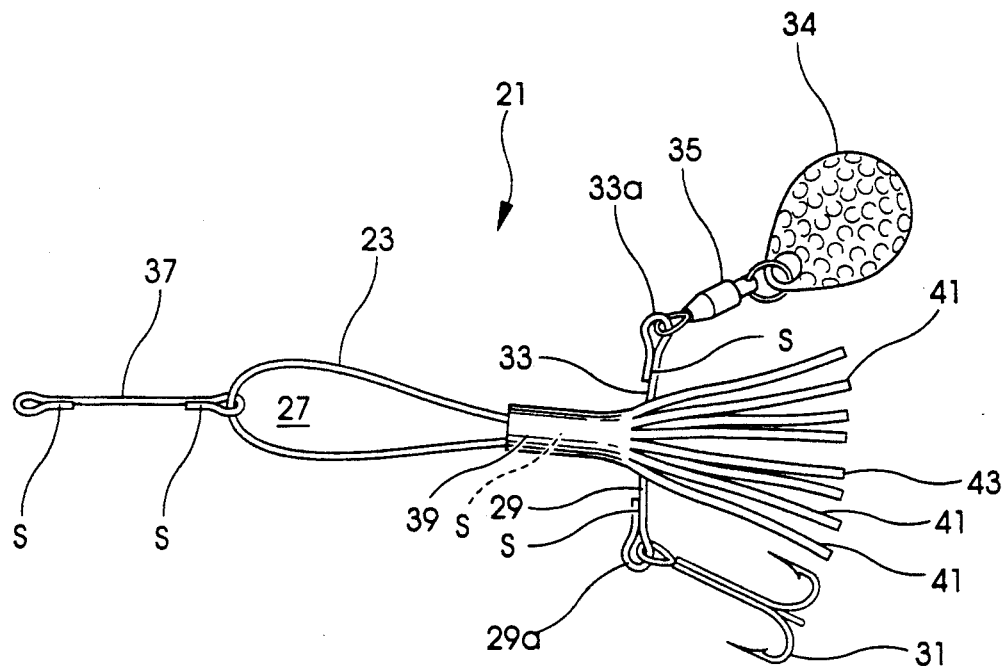
FIG. 2 is an isometric view of a larger fishing lure having a single spinner and a skirt.

Referring now to FIG. 2, a fishing lure 21 having a bait sized profile is shown. Fishing lure 21 is slightly larger than the lure 11 of FIG. 1 and is intended to attract larger fish. Fishing lure 21 includes a relatively rigid substantially elliptical or tear-drop shaped metallic ring 23 defining a central opening 27. Fishing lure 21 includes a lower projection 29 formed into a loop 29a for receiving a treble fishing hook 31. Upper projection 33 includes loop 33a to which swivel 35 and spinner 34 are attached. Link 37 is identical in form and function to the link 20 of FIG. 1. A rubber skirt 39 is included in this embodiment as an additional means for attracting fish. In this embodiment the rubber skirt 39 is formed from a resilient rubber tubing split into a plurality of strips 41 which move or flutter as the fishing lure is pulled through the water. These strips 41 may be brightly colored or of contrasting colors or shades to lure a fish to strike. Materials and construction techniques for lures 11 and 21 are substantially identical. Solder or other appropriate adhesive is applied at locations labeled S to secure the bent wire to itself.

Figure 3:
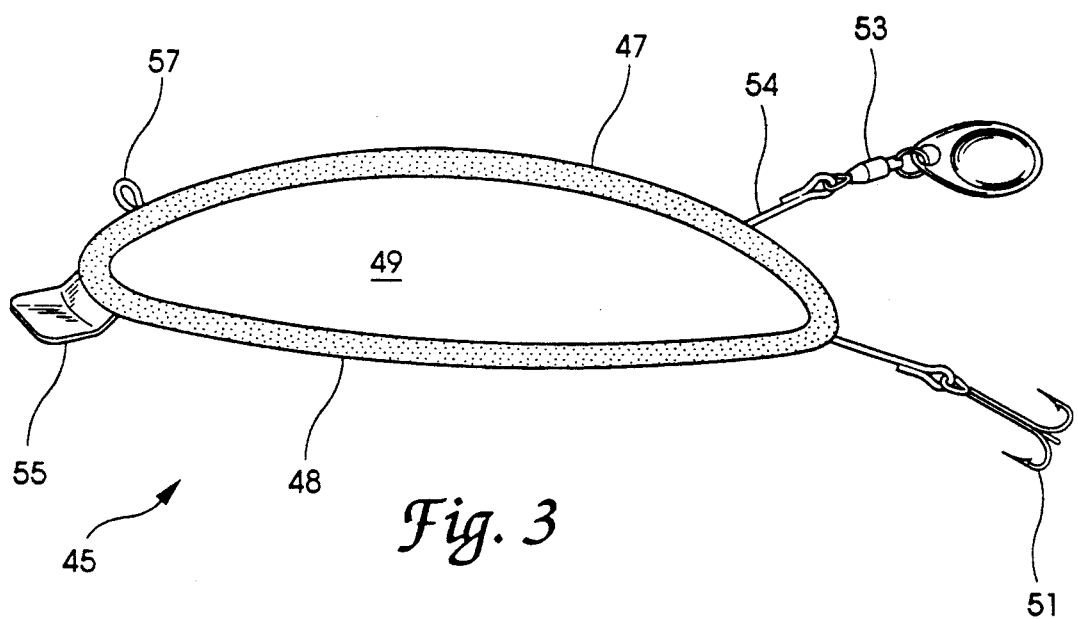
FIG. 3 is an isometric view of a fishing lure according to another aspect of the present invention including a single ring and having a front spoon and a spinner.

Referring now to FIG. 3, a fishing lure 45 according to another aspect of the present invention is illustrated. Fishing lure 45 includes a molded or extruded substantially elliptical or tear-drop shaped polymeric ring 47 defining a center opening 49. Lure 45 includes a treble hook 51 and a swivel spinner 53 attached to arm 54. Lure 45 optionally includes a fluid engaging surface 55 to produce the well known action of a deep diving fishing lure. Weight is added within the lower body portion 48 by addition of a heavy substance, such as lead, to adjust the running depth of the lure and to assist in maintaining the attitude of the lure. The verticality of the lure may be increased by using a relatively light or hollow polymer to construct ring 41 and by weighting the lower portion 48 of the lure so that the lower portion 48 is oriented at a lower position when lure 45 is placed in water. A fishing line is attached to an eyelet 57 that is integrally molded into or adhesively attached to ring 47. It is contemplated that alternative embodiments may include bait shaped polymer rings having a bait color and silhouette corresponding to a particular variety of fishing bait known to those of skill in the art. If a hollow ring is utilized, lead shot may be secured inside the bottom portion to maintain the verticality of the lure.

Figure 4:
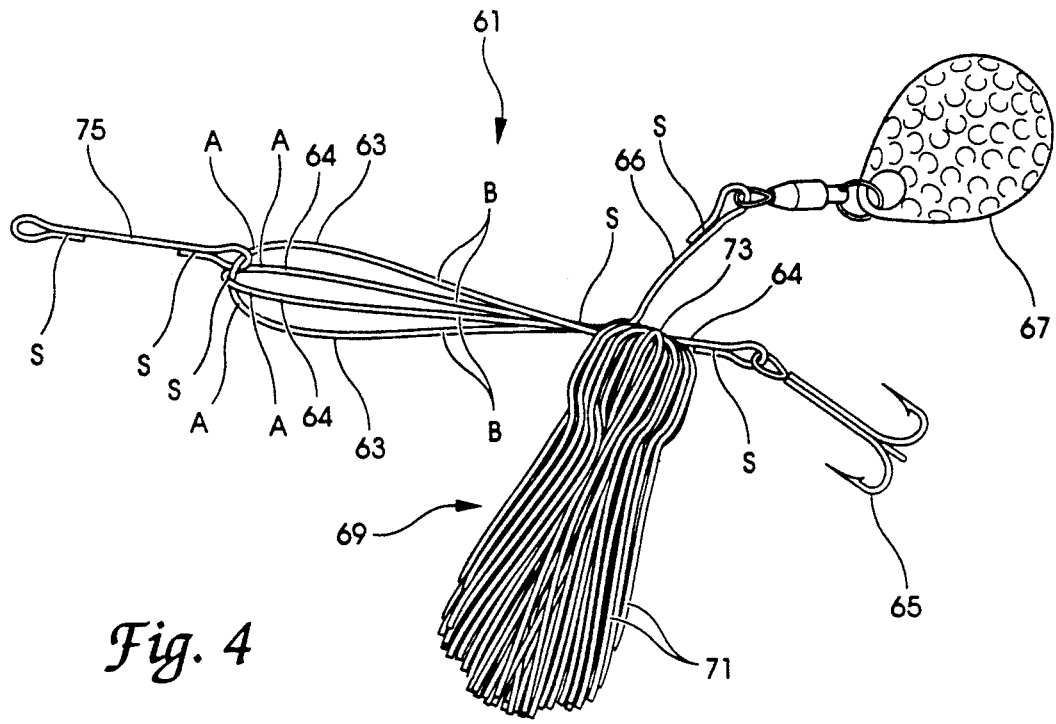
FIG. 4 is an isometric view of a fishing lure according to another aspect of the present invention.
Figure 5:
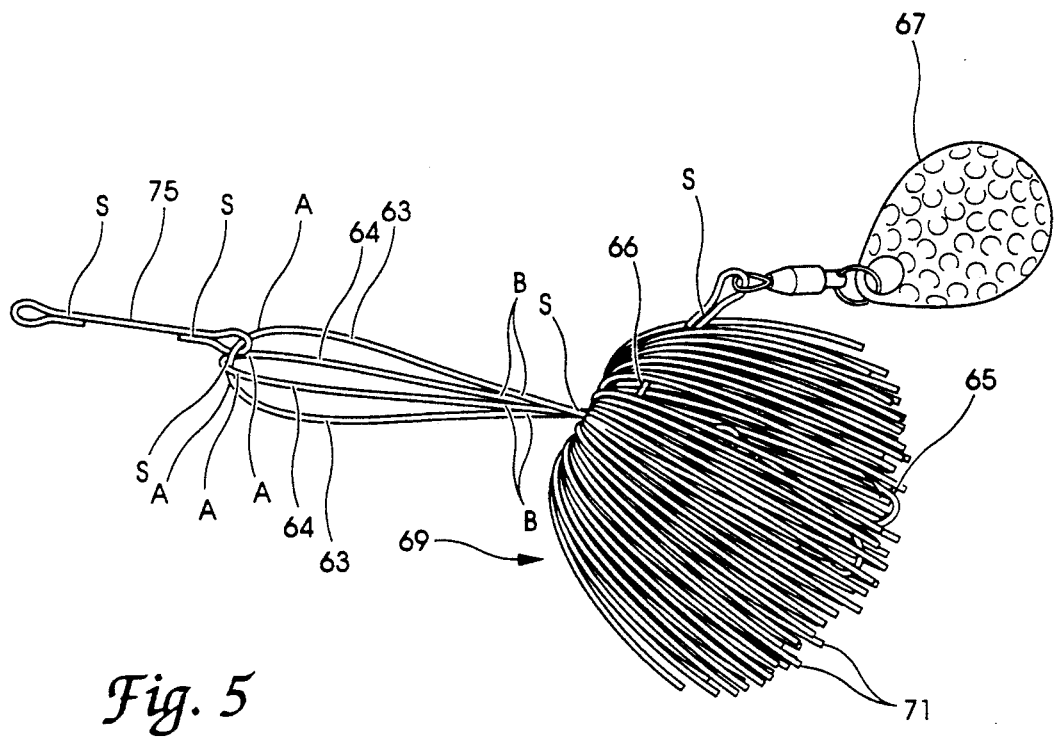
FIG. 5 is an isometric view of the lure of FIG. 4 illustrating the skirt in its normal position.

Referring to FIGS. 4 and 5, a fishing lure apparatus 61 according to another aspect of the present invention is shown. Fishing lure 61 includes two nonparallel intersecting substantially elliptical or tear-drop shaped rings 63 and 64 attached to each other via solder at locations marked S. Other locations where solder is applied to attach or secure portions of the lure 61 made from bent wire are also labeled S. Rings 63 and 64 include rounded portions A and tapered tip portions B. Fishing lure 61 includes a treble hook 65 attached to projection 64, a spinner 67 attached to projection 66, and a skirt 69. The skirt 69 is comprised of flexible rubber-like strips 71 that are tied or attached to a fishing lure at location 73 near treble hook 65. A link 75 or means for attaching a fishing line to lure 61 is also shown. Link 75 is substantially identical in form and function with the link 20 of FIG. 1 and moves freely along ring 63 to enable changing angular forces that are occasionally needed to free or dislodge the lure 61 when "hooked" on an undesirable catch such as a log or tree root. A fishing lure having multiple intersecting rings provides a three dimensional or space-frame bait silhouette. Additional nonparallel intersecting rings are also contemplated. FIG. 4 illustrates the skirt 69 of the fishing lure apparatus 61 in a position to reveal the hook 65. FIG. 5 depicts the skirt 69 in its normal posture or attitude covering a portion of the lure frame and the hook 65. Skirt 69 provides a means for attracting fish by its motion and varying color pattern when drawn through the water by a fisherman.

Figure 6:
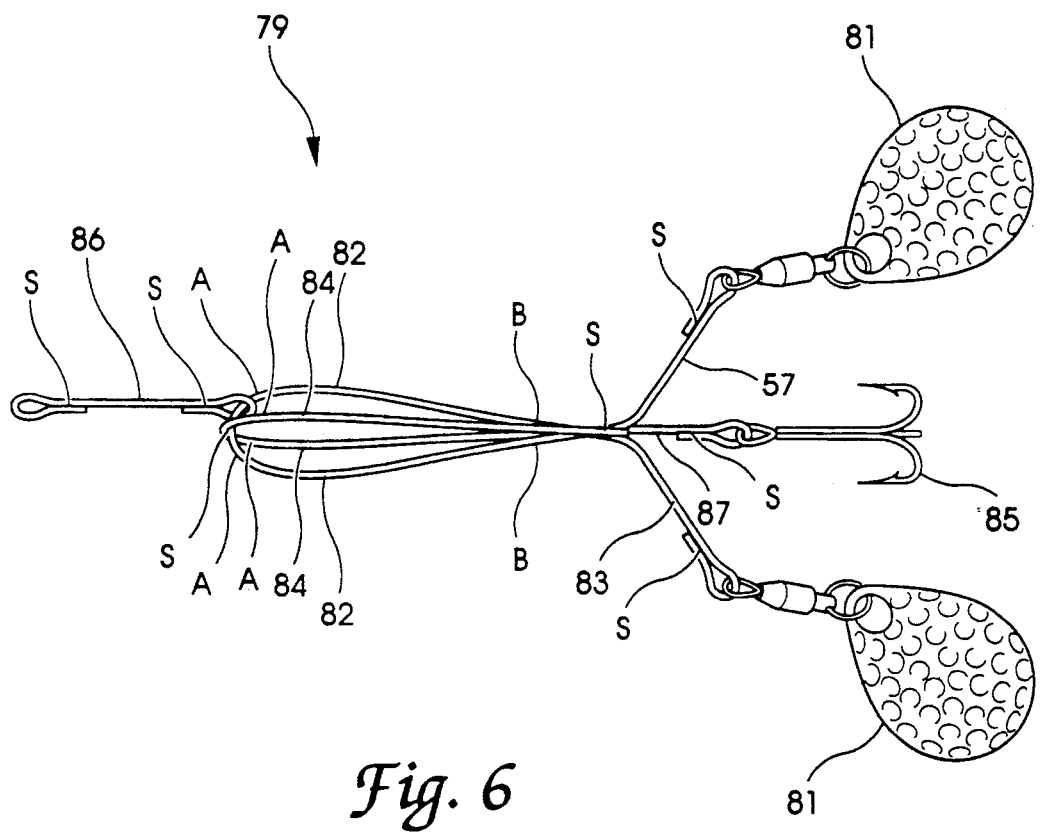
FIG. 6 is an isometric view of a fishing lure according to a another aspect of the present invention.

Referring now to FIG. 6, a fishing lure 79 according to yet another aspect of the present invention is illustrated. Lure 79 includes two nonparallel intersecting substantially elliptical or tear-drop shaped rings 82 and 84 attached to each other via solder or other adhesive at locations labeled S. Rings 82 and 84 include rounded portions A and tapered tip portions B. Lure 79 includes spinners 81 attached to projections 83. Link 86 is identical with link 20 in form and function and provides a means for attaching lure 79 to a fishing line. Links 20, 37, 75 and 86 are slidably attached to their respective elliptical rings. Treble hook 85 is attached to projection 87. The position of spinners 81 with respect to hook 85 helps guide lure 79 and prevent hook 85 from snagging onto undesirable objects beneath the surface of the water such as logs, tree roots etc. Additional spinners and additional projections are contemplated to encircle the hook 85 and provide more protection from snags as well as additional means for attracting fish.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A fishing lure comprising:
   a substantially elliptical ring having a center opening, said ring corresponding generally in profile and size to a fishing bait, and wherein said ring allows fluid to flow transversely through said center opening as said ring is drawn through a body of water in a direction perpendicular to fluid flow in the body of water, wherein said ring includes a first projection and a second projection extending out from said ring;
   a fishing hook mounted to said first projection of said ring;
   a link attached to and slidably engaging said ring, said link including a loop therein for receiving a fishing line;
   means for attracting fish attached to said second projection of said ring; and
   wherein the attitude of said lure is substantially stable as it is drawn through water.

2. The lure of claim 1 wherein said means for attracting fish is a swivel mounted spinner.

3. The lure of claim 1 wherein said means for attracting fish is a rubber-like skirt.

4. The lure of claim 1 wherein said ring and projections are formed from a wire bent into a ring and the ends of said wire comprise said first and second projections, and including adhesive applied to said bent wire to attach said wire to itself to form said ring.

5. The lure of claim 4 wherein said projections formed of wire include loops formed in the projections to which said fishing hook and said means for attracting fish are attached.

6. The lure of claim 5 wherein said means for attracting fish is a swivel mounted spinner.

7. The lure of claim 5 wherein said means for attracting fish is a rubber-like skirt.

8. A fishing lure comprising:

a first tear-drop shaped ring having a rounded portion and a tapered tip portion;

a second tear-drop shaped ring having a rounded portion and a tapered tip portion, said first and second rings having substantially similar shapes, and wherein said first ring is disposed within and joined to said second ring at a location on said rounded portion and at said tip portion;

a fishing hook mounted to the tapered tip portion of said first and second rings;

a first projection extending from said tapered portion of said first and second rings;

means for attracting fish attached to said first projection; and wherein the attitude of said lure is substantially stable as it is drawn through water.

9. The lure of claim 8 wherein said means for attracting fish is a swivel spinner.

10. The lure of claim 8 including a second projection and wherein said first projection and said second projection are disposed in opposing relationship with with said tapered tip portion of said rings, and wherein said means for attracting is a swivel spinner.

11. The lure of claim 10 wherein said rings are each formed from a single piece of wire bent into a tear-drop shape and wherein said rings are attached to each other using an adhesive.

12. The lure of claim 11 including a link slidably attached to said first ring at said rounded portion, said link including an eyelet for receiving a fishing line, and wherein said adhesive is solder.

13. The lure of claim 8 wherein said rings are hollow and substantially tubular in cross-section.

14. The lure of claim 13 wherein sinker weight is disposed within said hollow rings to maintain said lure in a particular attitude when said lure is drawn through water.

15. The lure of claim 13 wherein said means for attracting are swivel spinners.

16. A fishing lure comprising:

a tear-drop shaped loop having a round portion and a tapered tip portion;

a first projection extending upward from said tapered tip portion and having an eyelet therein;

a second projection extending downward from said tapered tip portion and having an eyelet therein;

a hook attached to said eyelet of said second projection;

a swivel spinner attached to said eyelet of said first projection; and a fishing line link slidably attached to said round portion, said link including an eyelet for receiving a fishing line.

17. The lure of claim 16 wherein said tear-drop shaped loop, said first projection and said second projection are formed from a single piece of metal wire bent into a tear-drop loop and wherein the free ends of said wire form said first and second projections.

18. The lure of claim 17 wherein said wire is attached to itself to form said loop with solder.

* * * * *